United States Patent [19]

Eastman et al.

[11] Patent Number: 4,798,103
[45] Date of Patent: Jan. 17, 1989

[54] AUTOMATIC TRANSMISSION WITH ADD-ON OVERDRIVE

[75] Inventors: Richard E. Eastman, Central Square; Stewart J. Woodcock, Fayetteville, both of N.Y.

[73] Assignee: Chrysler Motors Corporation, Highland Park, Mich.

[21] Appl. No.: 133,159

[22] Filed: Dec. 11, 1987

Related U.S. Application Data

[63] Continuation of Ser. No. 7,871, Jan. 28, 1987, abandoned.

[51] Int. Cl.$^4$ .............................................. F16H 37/04
[52] U.S. Cl. ........................................ 74/740; 74/762; 74/782; 192/18 A
[58] Field of Search ............ 74/740, 763, 762, 781 R, 74/782, 783; 192/18 A

[56] References Cited

U.S. PATENT DOCUMENTS

| | | | |
|---|---|---|---|
| 2,985,036 | 5/1961 | Forster | 74/740 |
| 3,396,610 | 8/1968 | Rich, Jr. et al. | 74/740 |
| 3,444,761 | 5/1969 | Wickman | 74/740 |
| 4,282,957 | 8/1981 | Sugimoto et al. | 74/740 X |
| 4,404,869 | 9/1983 | Numazawa et al. | 74/740 |
| 4,416,168 | 11/1983 | Arai et al. | 74/740 |
| 4,455,890 | 6/1984 | Kuramochi et al. | 74/763 X |
| 4,480,499 | 11/1984 | Kubo et al. | 74/740 X |
| 4,649,771 | 3/1987 | Atkinson et al. | 74/781 R |

FOREIGN PATENT DOCUMENTS

| | | | |
|---|---|---|---|
| 0148619 | 11/1980 | Japan | 74/740 |
| 0005561 | 1/1983 | Japan | 74/740 |

*Primary Examiner*—Rodney H. Bonck
*Assistant Examiner*—Dwight G. Diehl
*Attorney, Agent, or Firm*—Edward P. Barthel

[57] ABSTRACT

An add-on overdrive unit for location on an extended output shaft of an automatic transmission. The unit includes a planetary gear set connected by means of its annulus gear to an outer face of a one-way clutch. The one-way clutch inner face is concentrically interconnected to the transmission output shaft. An hydraulic piston operates a first direct-drive clutch pack and a second overdrive clutch pack. The piston is normally biased to its non-pressurized failsafe direct drive position by a compression coil spring. As a result the direct drive clutch pack is engaged causing the planetary sun gear to be locked to the annulus gear providing a one-to-one direct drive speed ratio to the overdrive output shaft via the engaged one-way clutch outer race. Upon the piston being pressurized the overdrive clutch pack is engaged and the direct drive clutch pack is released grounding the sun gear to the overdrive case. In its overdrive mode torque is transferred from the transmission output shaft via a planet carrier ring, the planet gears and the annulus gears to the outer face of the disengaged one-way clutch. Thus, drive torque is transferred through the direct-drive clutch pack only in the reverse mode of the transmission.

2 Claims, 3 Drawing Sheets

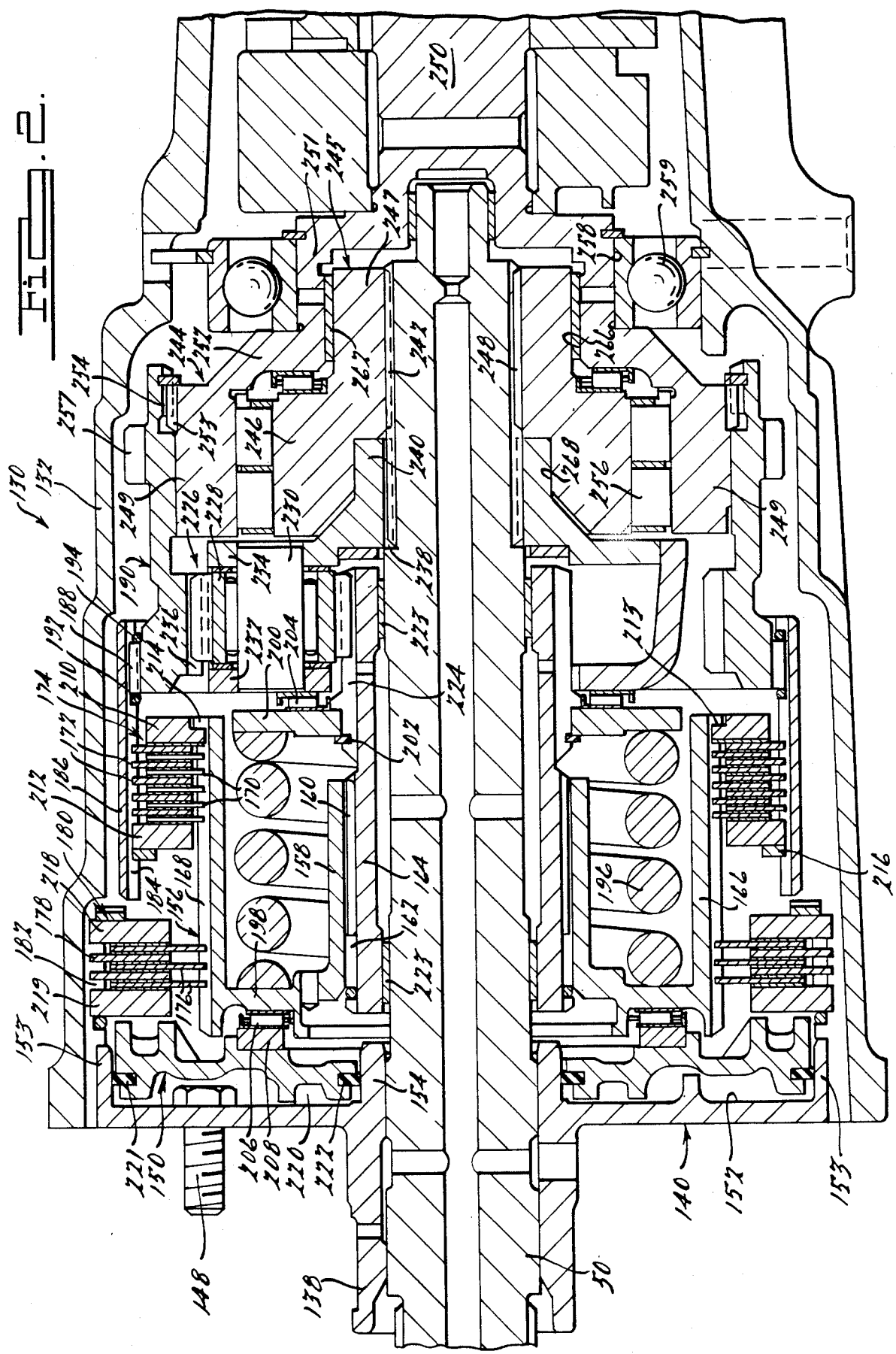

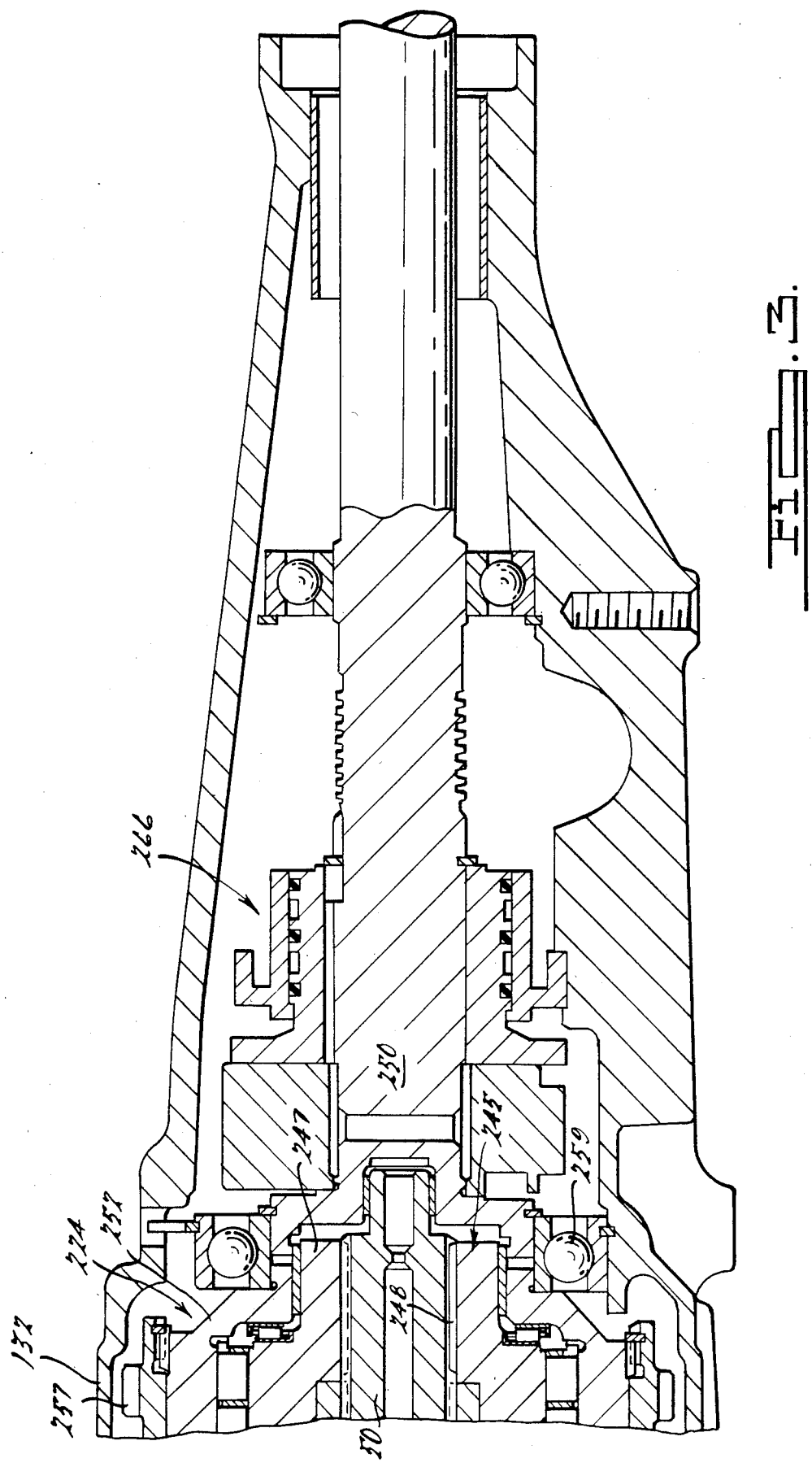

AUTOMATIC TRANSMISSION WITH ADD-ON OVERDRIVE

This is a continuation of commonly owned copending patent application Ser. No. 07/007,871 filed Jan. 28, 1987 and now abandoned.

BACKGROUND OF THE INVENTION

This invention relates generally to an automatic power transmission for use in motor vehicles and more particularly to an add-on overdrive unit adapted to provide a fourth forward-driving speed ratio for an existing three speed automatic transmission.

The U.S. Pat. No. 4,095,487 issued June 20, 1980 to Cartwright et al discloses a three forward speed and reverse drive motor vehicle automatic transmission adapted for use with an engine which extends transversely on the vehicle. There have been numerous overdrive devices proposed for establishing a reduction gear ratio of less than one for automatic transmissions of the type disclosed in the Cartwright patent. The advantages of such overdrive units include less engine noise during high speed operation and improved fuel consumption. Examples of overdrive arrangements for automatic transmissions are found in U.S. Pat. Nos. 4,453,429; 4,455,890; and 4,567,788.

SUMMARY OF THE INVENTION

Briefly, this invention comprises an add-on overdrive unit for an automatic transmission wherein an overdrive ratio is achieved. The add-on unit is located on an extended portion of the transmission's output shaft and includes a single planetary gear set unit having its annulus gear splined to an outer race of an overrunning one-way clutch. The carrier of the planetary gear set has one carrier ring splined to the transmission output shaft. The one-way clutch outer race is directly connected with the overdrive output shaft which shaft is coaxially aligned with the transmission output shaft. The one-way clutch inner race is splined to the transmission output shaft.

A feature of the overdrive unit is the use of a single hydraulically stroked spring biased piston to control a first direct drive friction clutch pack and a second overdrive friction clutch pack. The piston is normally biased by the spring to a non-pressurized or destroked position engaging the direct-drive clutch pack. This provides a direct-drive mode of the overdrive unit upon the transmission output shaft being driven in a first rotational direction. With the direct-drive clutch pack engaged, the planetary sun gear is locked to the annulus gear. Further, an outer sleeve drivingly interconnects the direct-drive clutch pack with the planetary annulus. As a result the one-way clutch outer race is driven into engagement with the inner race via coupling means located therebetween, thus, establishing a one-to-one drive ratio. Drive torque, however, is transferred directly from the transmission output shaft to the inner race and thence to the overdrive output shaft via the engaged one-way clutch outer race obviating the transmission of drive torque through the direct-drive clutch pack.

Upon hydraulic pressure from the transmission being supplied to the piston, the piston is moved to its stroked position against the spring biasing force. This disengages the direct-drive clutch pack and engages the overdrive clutch pack grounding the planetary sun gear to the overdrive unit case. As a result, drive torque is transferred from the transmission output shaft to one planetary carrier ring splined thereto. Drive torque is then transferred from the carrier ring to the planetary pinion gears and the annulus gear overdriving the one-way clutch outer race thereby transferring an overdrive speed ratio to the overdrive output shaft.

Another feature of the invention is that upon the transmission being placed in its reverse mode the piston, which is biased in its de-stroked position by the spring, engages the direct-drive clutch pack and disengages the overdrive clutch pack. With the transmission output shaft now being rotated in its opposite or reverse direction the one-way clutch inner race is also driven in the reverse direction. At the same time a carrier ring splined to the transmission output shaft is rotated in the reverse direction together with the pinion gears and annulus gear. However, the engaged direct-drive clutch pack, by means of the outer sleeve, is also driving the outer race in the reverse direction in unison with the inner race even though the one-way clutch coupling means are not engaged. Thus, a one-to-one gear ratio drive torque is transferred to the overdrive output shaft through the direct drive clutch pack only in the reverse mode of the transmission, thereby minimizing wear on the overdrive unit.

Another feature of the present invention is the incorporation of external parking sprag teeth on the planetary annulus gear member thereby enabling the positive locking of the transmission's main shaft against rotation with the transmission's selector in its park mode obviating locking the transmission through its clutch packs or break bands.

Other features and advantages of this invention will be made apparent by reference to the following description and accompanying drawings in which one of various possible embodiments is illustrated.

BRIEF DESCRIPTION OF THE DRAWINGS

FIG. 2 is an enlarged fragmentary cross-sectional view of the overdrive unit forward portion; and FIG. 3 is an enlarged fragmentary cross-sectional view of the overdrive unit aft portion.

DETAILED DESCRIPTION OF THE INVENTION

Figure 1:
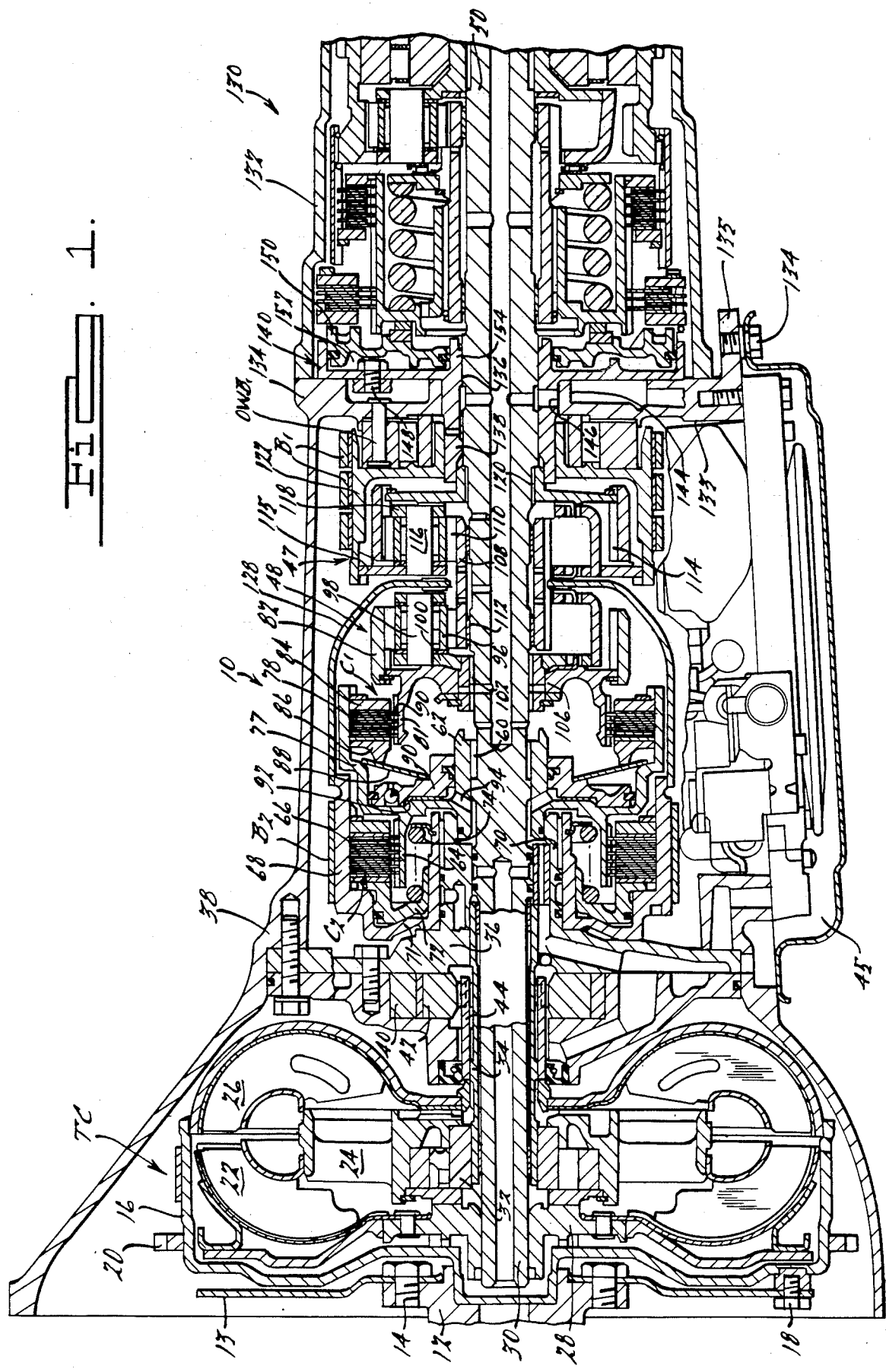
FIG. 1 is a cross-sectional view of a three speed automatic transmission together with a fragmentary portion of the overdrive unit.

Referring now to the drawings, there is shown in FIG. 1 a longitudinal sectional view of a vehicle's automatic transmission generally indicated at 10. The end portion of a driving member, such as a vehicle crankshaft, is indicated at 12 in FIG. 1. Reference may be made to the above mentioned U.S. Pat. No. 4,095,487 which diagrammatically shows a motor vehicle engine and drive train of a type suitable for use with the present invention. The disclosure of the U.S. Pat. No. 4,095,487 is incorporated by reference herein.

The crankshaft 12 is drivingly connected to a drive transmitting ring 13 by fasteners 14 and the ring 13 is suitably connected to a torque converter casing 16 by bolts 18. An engine starter ring 20 is mounted on and extends around the periphery of the torque converter casing 16.

The torque converter casing 16 contains a conventional turbine 22 and stator or reaction member 24, as well as an impeller 26, with the impeller being integrally connected to the casings 16 and the turbine member 22 being drivingly connected by a hub 28 to an input shaft 30. The stator 24 is connected by a one-way brake device, having an inner hub 32, to an axial sleeve 34 secured to a wall or partition 36 attached to the interior of a housing 38. The construction of a torque converter is well-known and reference may be had to the above mentioned U.S. Pat. No. 4,095,487 for a more detailed description of the transmission 10.

A hydraulic pump 40 has its driving element 42 connected to a rearwardly projecting end portion of torque converter casing flange portion 44. The pump 40 draws fluid from a supply sump 45 through conduit means (not shown) and circulates fluid through the torque converter, the transmission lubricating system, and the various hydraulically operated control mechanisms associated with this power transmission.

The gear box includes a forward drive clutch $C_1$, a reverse and direct drive clutch $C_2$, and a pair of planetary gear sets 47 and 48. The gearbox is adapted to cooperate with the torque converter to provide a means for the transmission of three forward drives and a reverse drive to a speed change section output shaft 50. The forward drive clutch $C_1$, is engaged whenever any of the three forward speeds are being used, and is disengaged when the transmission controls are set in either Neutral or Reverse. The direct drive clutch $C_2$ is engaged only when the third direct forward speed is being transmitted and whenever reverse drive is being transmitted.

The clutches $C_1$ and $C_2$ and the one rear planetary gear set 48 are located in the rear portion of the speed change section. The front portion of the speed change section houses the front planetary gear set 47. The front end of the converter driven gear box input shaft 30 is concentric with the forward end of the speed change section output shaft 50.

The transmission input shaft 30 is drivingly connected at 60 to a retainer member 62 which carries friction clutch disc elements 64 of the reverse and direct drive clutch $C_2$. The set of clutch discs 64 are adapted to a drivingly engaged with the use of clutch discs 66 drivingly connected to the interior surface of a drum 68. The drum 68 is journalled on the rearwardly projecting collar 70 on gearbox housing wall 36. A brake band $B_2$ is arranged to be selectively applied to the drum 68 to prevent rotation thereof. The drum 68 includes a backing plate 71 which cooperates with an axially shiftable piston 72 to effect drive transmitting engagement of the clutch discs 64 and 66. An annular spring 74 normally urges the piston 72 forwardly to a clutch disengaged position. Pressure fluid for operation of the clutch $C_2$ is supplied to the piston bore for piston 72 through conduit 76 connected to the hydraulically operated control system.

The retainer 62 has a rearwardly extending clutch drum 77 at its periphery. Clutch drum 77 has drivingly and shiftably mounted on as its interior face one or more clutch discs 78. The clutch discs 78 are drivingly engaged with the clutch discs 80 which are carried by the exterior surface of annular member 81 connected to annular gear 82 of the planetary gear set 48. Clutch discs 78 and 80 are arranged to be drivingly compressed against a backing plate 84 by a pressure plate member 86 actuated by a lever spring plate 88. Lever spring plate 88 is operated by a piston 90 which reciprocates in a cylinder bore 92 formed in the rearside of the retainer member 62. Pressure fluid is supplied to the cylinder bore 92 through a conduit 94 connected to the hydraulically operated control system.

Arranged concentrically within the forward drive clutch $C_1$, is the planetary gear set 48. This gear set comprises the annular gear 82, a sun gear 96, a planet pinion gear 98, connecting gears 82 and 96, and a planet pinion gear carrier 100 which rotatably supports the pinion gearing. Carrier 100 is splined to the speed change output shaft 50 at 102. Annulus gear 82 is supported on an annular member 81 rotatably mounted by bushing 106 at the hub portion of the carrier 100. The sun gear 96 is an integral part of a double sun gear sleeve 108, with the sun gear 96 being formed on the front end and a sun gear 110 of the planetary set 47 being formed on the rear end thereof. Bearings 112 mount the sun gear sleeve 108 on the output shaft 50.

The rearwardly located gear set 47 includes the sun gear 110 and annulus gear 114, planet pinion gearing 116, which connects gears 110 and 114, and a planet pinion carrier 118 rotatably supporting pinion gearing 116. Annulus gear 114 is drivingly connected to the output shaft 50 by splines 120. Pinion gear carrier 118 is drivingly connected at 115 to the brake drum 122. Brake bands $B_1$, are arranged to be selectively applied to the brake drum 122 to prevent rotation thereof. The brake drum 122 is restrained against reverse rotation, counterclockwise when looking from the left towards the right of the transmission, by means of a conventional one-way brake device indicated at $OWB_1$.

Inter-connection between the two axially spaced adjacent gear sets 47 and 48 is by way of the common gear sleeve 108 and by the dual connections of the front carrier 100 and the rear annulus gear 114 to the common speed change section output shaft 50. The drum 68 is connected by the bell-shaped member 128 to the sun gear sleeve 108.

As best seen in FIGS. 1 and 2, an add-on overdrive unit, indicated generally at 130, is adapted for coupling to the aft end of the three speed transmission 10. The overdrive unit 130 provides a higher gear ratio of less than one and reduces noise of the engine during operation at high speed while improving vehicle fuel consumption.

The overdrive unit 130 includes a one-piece casing 132 removably secured to aft end wall 134 of the transmission housing such as by machine bolts (not shown). The transmission output shaft 50 extends rearwardly through an axial passage 136 in a central hub portion 138 of overdrive casing forward bulkhead generally indicated at 140 in FIG. 1. The transmission housing aft end wall 134 is formed with a central boss 144 having an axial bore 146 slidably receiving therein the bulkhead central hub portion 138. The casing bulkhead 140 is secured to the transmission housing aft wall 134 by a plurality of machine bolts, one of which is shown at 148.

As best seen in FIG. 2 the overdrive portion of the transmission includes an axially movable annular piston 150 which is slidably received in a piston cup or cylinder portion 152. The cylinder portion 152 is formed in the bulkhead 140 by means of its peripheral rearwardly extending outer annular flange 153 and inner annular flange 154 disposed in concentric relation. A dual walled clutch spool, generally indicated at 156 in FIG. 2, is concentrically disposed about a rearwardly extending portion of the transmission's main shaft 50. The clutch spool 156 has an inner cylindrical wall 158 formed with internal splines 160 meshed with external splines 162 of an inner sleeve member 164. Outer cylindrical wall 166 of the clutch spool 156 has external splines 168 splined to an inner set of clutch pack discs 170. The inner discs 170 are interleaved with a set of outer companion discs 172 of a first multiple disc direct drive clutch pack 174.

The outer wall external splines 168 are also splined to a set of inner discs 176 interleaved with a set of outer companion discs 178 of a second multiple disc overdrive clutch pack generally indicated at 180. It will be noted that the outer discs 178 are splined to internal splines 182 formed integral with the inner wall of the overdrive casing 132. Further, the outer discs 172 of the direct drive clutch pack 174 are splined to internal splines 184 of an outer sleeve member 186. The outer sleeve member 186 has its internal splines 184 in engagement with external splines 188 formed on the forward end of annulus member 190. A pair of fore and aft annular wire rings 192 and 194 respectively, are received in associated internal grooves on either side of outer sleeve member 186 capturing annulus external splines 188 therebetween. The annular wire rings 192 and 194 retain the outer sleeve member 186 against axial movement relative to the annulus member 190.

A single coil compression spring 196 is concentrically disposed intermediate the inner 158 and outer 166 walls of the clutch spool 156. The coil spring 196 is compressed between annular spool base wall 198 and spring abutment means in the form of a compression ring 200. The ring 200 is fixedly mounted on inner sleeve 164 by means of retaining ring 202. A needle bearing assembly 204 is positioned intermediate the compression ring 200 and a planetary gear unit to be described. The spool base wall 198 is spaced from the piston 150 by means of a needle bearing assembly 206 and an annular select spacer ring 208.

The compression spring 196, as shown in FIG. 2, is operative to bias the direct drive clutch pack 174 into its clamped or engaged state. That is, the ring 196 normally biases the direct drive clutch pack inner discs 170 into contact with the outer discs 172 by means of the forward or leftward travel of pressure plate member 210 against the resistance of fixed backing plate 212. The pressure plate 210 has a step 213 locked to the spool outer wall 166 by abutment with annular wall collar 214 while the pressure plate 212 is fixedly positioned to the outer sleeve 186 by retaining ring 216.

The overdrive clutch pack 180 has the outer periphery of a backing plate 218 splined to the casing splines 182 against which the overdrive clutch discs 176 and 178 are drivingly compressed by pressure plate 219 as the piston 150 is stroked rearwardly or rightwardly upon pressure chamber 220 being pressurized. Pressure chamber 220, defined by the cylinder portion 152 and piston 150, is sealed by piston outer resilient ring 221 contacting bulkhead outer flange 153 and piston inner resilient ring 222 contacting bulkhead inner flange 154.

FIG. 2 shows inner sleeve member 164 being journally supported on the extension of the transmission output shaft 50 for relative rotation therewith by means of axially spaced bushings 223. The aft or rightward end of sleeve member 164 is formed with external teeth 224 defining a sun gear portion of a planetary gear set unit generally indicated at 226. The planetary gear set unit includes a plurality of planet pinion gears 228 journally mounted on pinion shafts 230 having their ends rotatably supported in fore and aft carrier rings 232 and 234, respectively. The pinion gears 228 mesh with both the sun gear teeth 224 and annulus internal gear teeth portion 236 of the annulus member 190. The carrier aft ring member 234 has internal splines 238 on an integral rearwardly extending cylindrical neck portion 240 splined to external splines 242 on the transmission output shaft 50.

An overrunning coupling or one-way clutch assembly, generally indicated at 244, has an integrally combined inner race and hub member 245 including inner race portion 246 and cylindrical hub portion 247. The hub portion 247 has an axial bore formed with internal splines 248 engaging the transmission output shaft external splines 242 rearwardly of the aft carrier ring neck portion internal splines 238. The one-way clutch outer race member comprises an outer race portion integral with an overdrive output shaft portion. Thus, the outer race member includes an outer race portion 249 and an overdrive output shaft 250 interconnected to a stepped shoulder having an axial portion 251 and a radial portion 252. The outer race portion 249 of the one-way clutch has external splines 253 splined to annulus internal splines 254 adjacent the aft or rightward end of the annulus member 190. Coupling means in the form of plurality of rollers 256 are inserted between the outer race portion 249 and the inner race 246 of the one-way clutch in a conventional manner. It will be noted that the annulus member 190 includes external parking sprag teeth 257 formed thereon. Further, the stepped shoulder portions 251 and 252 define an external notch 258 for reception of a ball bearing assembly 259 journally supporting the one-way clutch assembly.

Because the parking sprag teeth 257 are located on the annulus member 190 a positive transmission park-locking position is provided via engaged splines 253 and 254 to the outer race portion 249 and thence to the overdrive output shaft 250. That is, the park-locking path is not transferred through any clutch packs or brake bands reducing wear on the transmission. An example of a parking mechanism suitable for use with the present invention is shown in U. S. Pat. No. 4,223,768 issued Sept. 23, 1980 to Iwanage. The Iwanage disclosure is hereby incorporated by reference in the present application.

The outer race member of the one-way clutch stepped axial shoulder 252 is journalled at 262 on the reduced axially extending pilot hub portion 247 of the inner race 246. The stepped axial shoulder portions define an axially extending cup-shaped bore 266 sized to journally receive the inner race hub portion 247 therein. In a like manner the one-way clutch inner race member forward face is formed with an axially extending countersunk pilot bore 268 sized to slidably receive or pilot the aft carrier ring neck portion 240 therein. This structural arrangement insures concentric alignment of the planetary carrier rings 232 and 234 relative to the transmission output shaft 50. A conventional speed governor assembly, generally indicated at 226 in FIG. 3, is concentrically mounted on the overdrive output shaft 250.

In operation, the add-on overdrive unit 130 is shown in its normal or "fail-safe" direct drive mode wherein the spring 196 biases the direct drive clutch pack 174 in its engaged or on state. In this direct drive mode torque from the transmission output shaft 50 is transferred directly to the one-way clutch inner race portion 246 by means of the transmission output shaft 50 and inner race engaged splines 242 and 248, respectively. The engine torque or mechanical drive then is transferred from the inner race portion 246 to the engaged rollers 256 and thus to the one-way clutch outer race portion 249 for delivery to integral overdrive output shaft 250. It will be noted that in the direct drive mode turbine torque is not transmitted through the engaged direct clutch pack 174 thus reducing wear on the overdrive unit. However, because the direct clutch pack is engaged, the planetary annulus member 190 is rotated in unison with the sleeve 164 which includes the sun gear teeth 224 thus insuring a one-to-one drive ratio being transferred to the overdrive output shaft 250 during the direct drive mode.

With the transmission placed in its reverse mode the transmission output shaft 50 is driven in an opposite or counter-clockwise rotational direction when viewed looking rearward or rightward in FIG. 2. In the reverse drive mode torque from the transmission output shaft 50 is transferred to the aft carrier ring 240 by means of the engaged splines 242 and 238, respectively. As the one-way integral clutch inner race and hub member 245 are rotated in the opposite or counter-clockwise direction the one-way clutch 244 is overdriven. That is, the one-way clutch freewheels and transmits no torque because the clutch rollers 256 are out of engagement. However, drive torque is transferred to the pinion gears 228 and then to the annulus member 190. As the direct drive clutch pack 174 is engaged in the reverse mode the annulus member 190 and the sleeve member 164, including its aft portion formed with the sun gear teeth 224, are locked together. Thus, the engaged clutch pack 174 causes the sleeve member 186 and the clutch spool 156 to rotate in unison.

By virtue of applicant's arrangement the annulus member 190, splined to the sleeve 186, transfers reverse drive torque to the one-way clutch outer race portion 249 and thus to its integral overdrive output shaft 250. It will be noted that in the reverse mode driving torque is transmitted through the direct clutch pack 174, while in the direct mode driving torque bypasses the direct clutch pack. Because the vehicle is operated primarily in its forward drive mode, the service life of the clutch pack 174 is greatly enhanced.

Upon the chamber 220 being pressurized, the piston 150 is moved rearwardly or to the right further compressing spring 196 and causing the clutch spool 156 to travel rearwardly. As a result, the overdrive clutch pack pressure plate 219 is contacted by the piston 150 and the overdrive clutch pack 180 is applied. This causes the inner sleeve 164 and sun gear teeth 224 to be held against rotation while the planetary carrier rings 232, 234; planetary gears 228 and annulus member 190 are rotated by the transmission output shaft 50. The annulus member 190, in turn, overdrives the outer race 250 of the one way clutch at a speed exceeding that of the integral inner race and hub member 245. With the one-way clutch in its freewheeling condition an overdrive gear ratio is delivered to the overdrive output shaft 250. In the disclosed embodiment the overdrive ratio is of the order of 0.69 to 1.0.

Although only one embodiment of the invention has been disclosed and described, it is apparent that other embodiments and modifications of the invention are possible.

We claim:

1. An overdrive unit for use with an automatic transmission, said transmission having an extended output shaft extending rearwardly therefrom through the forward open end of an overdrive outer casing and aligned on the longitudinal axis thereof, said overdrive unit comprising:

a planetary gear set concentrically disposed about said longitudinal axis and including a sun gear, an annulus gear and a carrier with fore and aft carrier rings supporting a plurality of planetary pinion gears in meshing engagement with said sun gear and said annulus gear, said aft carrier ring concentrically engaged with the transmission output shaft;

a one-way clutch including inner and outer concentrically disposed races with coupling means located therebetween, said one-way clutch positioned rearward of said aft carrier ring, said annulus gear having a rearwardly projecting portion surrounding a portion said outer race concentrically engaged therewith;

said inner race concentrically engaged with the transmission output shaft and said outer race concentrically engaged with an overdrive output shaft disposed coaxial with the transmission output shaft;

an outer sleeve surrounding a forward portion of said annulus gear and concentrically engaged therewith;

an inner sleeve concentrically journalled on said transmission output shaft, said inner sleeve having a rearwardly extending portion formed with external gear teeth defining said planetary gear set sun gear;

clutch spool means located forward of said fore carrier ring and concentrically disposed intermediate said inner and outer sleeves, compression spring means located in axial compression between said spool means and abutment means fixed said inner sleeve;

a first direct-drive clutch pack adapted for coupling said outer sleeve to said spool means;

a second overdrive clutch pack adapted for coupling said overdrive casing to said spool means;

a bulkhead sealingly enclosing said casing forward open end, said bulkhead defining a concentrically disposed annular cylinder on its rearwardly facing portion, a central piston slideably received in said cylinder operative when said cylinder is pressurized to be stroked rearwardly, said piston moving said spool means rearwardly thereby compressing said spring means;

said spring means operative to normally bias said spool means forwardly engaging said first direct drive clutch pack and disengaging said second overdrive clutch pack locking said outer and inner sleeves together wherein the driving torque of the transmission output shaft is delivered to said one way clutch inner race thus coupling said inner race to said outer race for direct drive of said overdrive output shaft obviating torque transfer through said direct drive clutch pack;

whereby upon said cylinder being pressurized said piston is stroked rearwardly compressing said spring means thereby disengaging said first direct drive clutch pack and engaging said second overdrive clutch pack, wherein said annulus gear is free to rotate relative to said inner sleeve and said sun gear teeth allowing said outer race to overdrive said inner race uncoupling said one-way clutch such than an overdrive gear ratio is transmitted from the transmission output shaft to said planetary gear set aft carrier ring, said planetary gears, and thence via said annulus gear and said outer race to said overdrive output shaft; and said clutch spool means in the form of a dual walled clutch spool having cylindrical outer and inner walls concentric with said transmission output shaft, said outer and inner walls connected at their forward ends by a radially extending base wall, and said spring means in the form of a single coil compression spring concentrically disposed about said transmission output shaft intermediate said spool outer and inner walls so as to be compressed between said spool base wall and said abutment means fixed to said inner sleeve.

2. An overdrive unit for use with an automatic transmission, said transmission having an extended output shaft extending rearwardly therefrom through the forward open end of an overdrive outer casing and aligned on the longitudinal axis thereof, said overdrive unit comprising:

- a planetary gear set concentrically disposed about said longitudinal axis and including a sun gear, an annulus gear and a carrier with fore and aft carrier rings supporting a plurality of planetary pinion gears in meshing engagement with said sun gear and said annulus gear, said aft carrier ring concentrically engaged with the transmission output shaft;
- a one-way clutch including inner and outer concentrically disposed races with coupling means located therebetween, said one-way clutch positioned rearward of said aft carrier ring, said annulus gear having a rearwardly projecting portion surrounding a portion said outer race concentrically engaged therewith;
- said inner race concentrically engaged with the transmission output shaft and said outer race concentrically engaged with an overdrive output shaft disposed coaxial with the transmission output shaft;
- an outer sleeve surrounding a forward portion of said annulus gear and concentrically engaged therewith;
- an inner sleeve concentrically journalled on said transmission output shaft, said inner sleeve having a rearwardly extending portion formed with external gear teeth defining said planetary gear set sun gear;
- clutch spool means located forward of said fore carrier ring and concentrically disposed intermediate said inner and outer sleeves, compression spring means located in axial compression between said spool means and abutment means fixed on said inner sleeve;
- a first direct-drive clutch pack adapted for coupling said outer sleeve to said spool means;
- a second overdrive clutch pack adapted for coupling said overdrive casing to said spool means;
- a bulkhead sealingly enclosing said casing forward open end, said bulkhead defining a concentrically disposed annular cylinder on its rearwardly facing portion, a central piston slideably received in said cylinder operative when said cylinder is pressurized to be stroked rearwardly, said piston moving said spool means rearwardly thereby compressing said spring means;
- said spring means operative to normally bias said spool means forwardly engaging said first direct drive clutch pack and disengaging said second overdrive clutch pack locking said outer and inner sleeves together wherein the driving torque of the transmission output shaft is delivered to said one way clutch inner race thus coupling said inner race to said outer race for direct drive of said overdrive output shaft obviating torque transfer through said direct drive clutch pack;
- whereby upon said cylinder being pressurized said piston is stroked rearwardly compressing said spring means thereby disengaging said first direct drive clutch pack and engaging said second overdrive clutch pack, wherein said annulus gear is free to rotate relative to said inner sleeve and said sun gear teeth allowing said outer race to overdrive said inner race uncoupling said one-way clutch such than an overdrive gear ratio is transmitted from the transmission output shaft to said planetary gear set aft carrier ring, said planetary gears, and thence via said annulus gear and said outer race to said overdrive output shaft;
- wherein said one-way clutch inner race member in the form of an integral inner race portion and a hub portion, said hub portion having an axial bore formed with internal splines engaging said output shaft external splines, said one-way clutch outer race member in the form of an outer race portion and an overdrive output shaft portion interconnected by a stepped shoulder defining an axial portion and a radial portion, said stepped shoulder portions defining an external notch receiving a ball bearing assembly therein so as to journally support said one-way clutch outer race member in said casing; and
- wherein said aft carrier ring formed with a rearwardly extending cylindrical neck portion having an internally splined bore engaged with said transmission output shaft external splines, said stepped shoulder portions defining an axially extending cup-shaped bore sized to journally receive said inner race hub portion therein, and wherein said one-way clutch inner race member having its forward face formed with an axially extending countersunk bore sized to slidably receive said aft carrier ring neck portion therein, providing concentric alignment of said carrier aft ring with said transmission output shaft.

* * * * *